United States Patent [19]

Gillet

[11] 4,266,821
[45] May 12, 1981

[54] COMBINED TAIL GATE AND TOOLBOX

[76] Inventor: Louis M. Gillet, 46 445 Washington St., Palm Desert, Calif. 92260

[21] Appl. No.: 6,640

[22] Filed: Jan. 26, 1979

[51] Int. Cl.³ .............................................. B60R 5/04
[52] U.S. Cl. .......................... 296/37.6; 224/42.03 R; 296/37.1
[58] Field of Search ................. 296/50, 37.1, 37.6, 296/37.13; 414/462; 224/42.03 R, 42.03 A, 42.06, 42.07, 42.43, 42.44

[56] References Cited

U.S. PATENT DOCUMENTS

| 1,815,656 | 7/1931 | McMurray | 296/37.1 |
| 2,784,027 | 3/1957 | Temp | 296/37.6 |
| 2,982,431 | 5/1961 | Moody | 224/42.03 R |
| 3,406,999 | 10/1968 | Kozicki | 296/37.1 |

FOREIGN PATENT DOCUMENTS

| 52535 | 1/1937 | Denmark | 296/37.6 |

*Primary Examiner*—John J. Love
*Assistant Examiner*—Ross Weaver
*Attorney, Agent, or Firm*—Knox & Knox

[57] ABSTRACT

A modified toolbox and modified tailgate combination primarily for pick-up trucks, with or without a camper shell thereon, in which the tailgate has confronting stanchions whereon the toolbox is mounted to pivot from a storage-travel position on the floor of the pick-up, to an open-access position with the tail gate open and extended, the toolbox automatically remaining upright on the opened tailgate.

3 Claims, 4 Drawing Figures

COMBINED TAIL GATE AND TOOLBOX

BACKGROUND OF THE INVENTION

Pick-ups, with and without camper shells, have heretofore frequently been equipped with toolboxes or like compartmented structure ordinarily more or less fixed in position within the box of the pick-up. The known prior art closest to the concept and structure of the instant invention is disclosed in U.S. Pat. No. 2,646,910.

There is a need for a toolbox construction for pick-ups and the like for providing unimpeded access to a toolbox carried thereby, so that the toolbox remains upright in both stored and extended positions, which need not be directly lifted into and out of the pick-up box since the weight of a toolbox with a complement of tools therein is cpnsiderable. It is also desirable that the toolbox and tailgate combination should be useable with a camper shell or the like on the pick-up to provide extra protection and security against theft of valuable tools when the shell is locked.

SUMMARY OF THE INVENTION

As claimed, this invention answers the above-mentioned need and comprises a combined tailgate and toolbox structure including opposed stanchions on the tailgate pivotally supporting the toolbox so that the toolbox is carried outwardly into a position above the tailgate when the latter is opened, the toolbox remaining upright at all times, and the exposed portions of the opened tailgate disposed laterally of the toolbox constituting workbenches stabilized by the weight of the toolbox.

DETAILED DESCRIPTION OF A PREFERRED EMBODIMENT OF INVENTION

Figure 4:
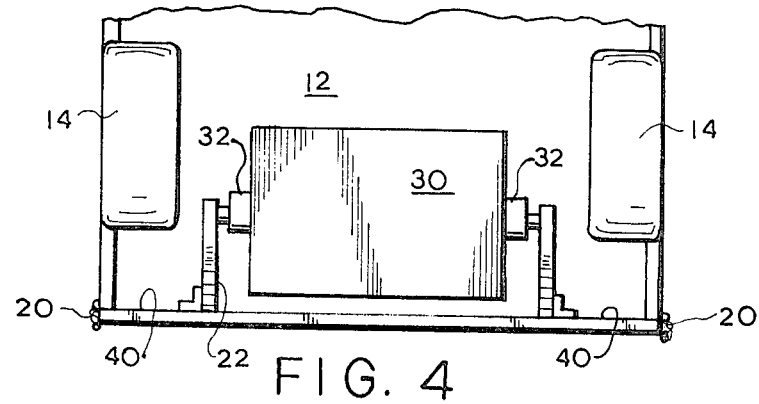
FIG. 4 is a diagrammatic top plan view, on a reduced scale, showing the toolbox in stored position with the tailgate closed.

Referring now to the drawing in which the same numerals refer to the same or similar parts and portions throughout the different views, the pick-up, shown fragmentarily in the figures, is indicated generally by the numeral 10. A pick-up box 12 normally occupies a space behind the cab of such a pick-up and wheel wells 14 occupy opposed lateral spaces as indicated best in FIG. 4. A tailgate 16 is hinged, as diagrammatically shown at 18, to the rear bottom edge of the pick-up box 12 and a stop chain 20 or the like limits the opening movement of the tailgate to the horizontal position illustrated, or alternatively to a downwardly inclined position.

The tailgate is provided with arms or stanchions 22 which may be V-shaped as shown, with attachment flanges 24 for securement to the tailgate in opposed relation. These stanchions pivotally support the toolbox 26 which ordinarily has side walls 28 or the equivalent and a removable top 30. The pivot mounting means may vary in form, that illustrated being essentially opposing trunnions 32 attached to the side walls 28 of the tool box and engaged in simple bearings in the stanchions 22. The pivot mounting means must be above the center of gravity of the toolbox so that the toolbox will remain upright when suspended on the stanchions 22.

Figure 2:
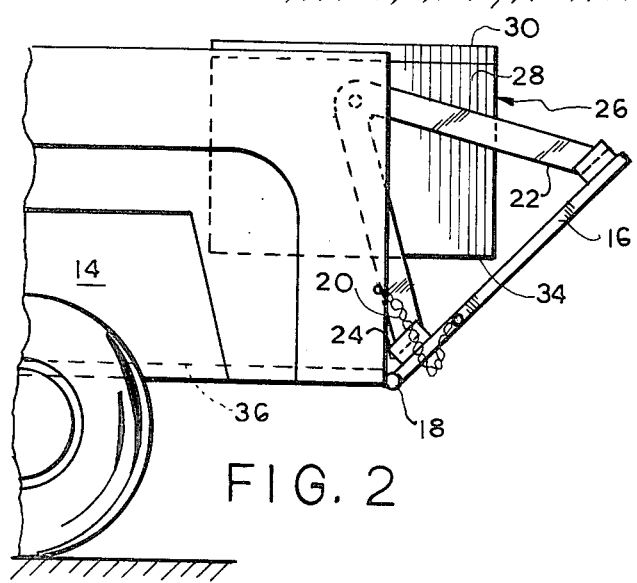
FIG. 2 is a similar view showing the tailgate partially opened, this figure indicating how the toolbox is raised slighly during the opening and closing of the tailgate.
Figure 3:
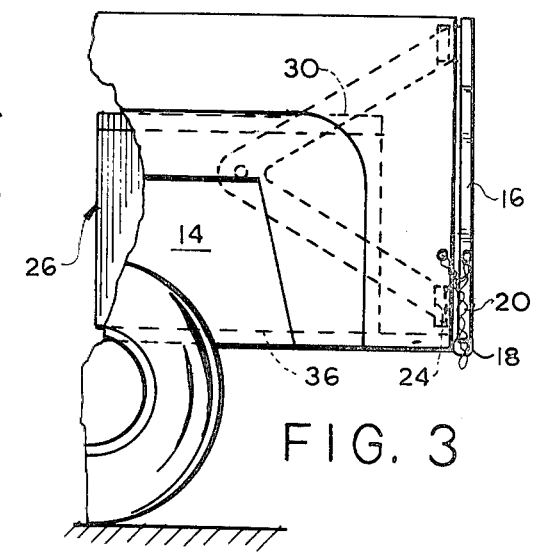
FIG. 3 shows the tailgate closed and the toolbox in stored position within the pick-up box and preferably resting upon the floor of the pick-up.

The dimensioning of the toolbox 26 and the effective dimensioning of the stanchions must be such that the bottom edge 34 of the toolbox will clear the tailgate 16 while the latter is being opened and closed, as indicated in FIG. 2. To accomplish this clearance the said edge 34 may be relieved or made arcuate if necessary.

Figure 1:
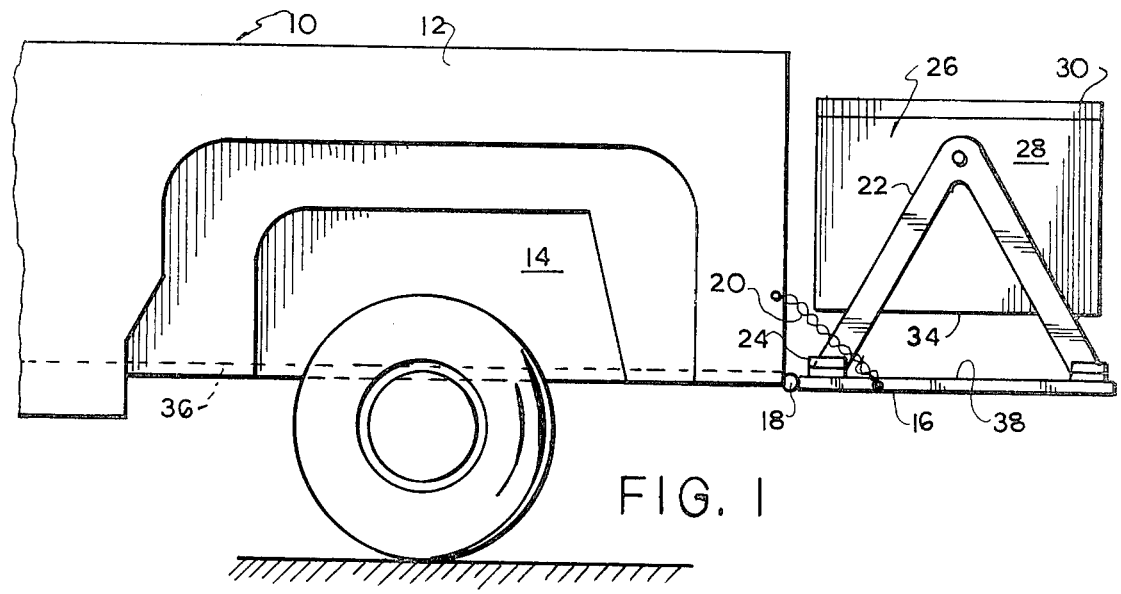
FIG. 1 is a slightly diagrammatic view of the rear end portion of a pick-up having this invention installed thereon, the tailgate being shown in open position.

When the tail gate is opened and supported in that position by the stop chains 20 the toolbox assumes what is termed herein as an open-access position such as shown in FIG. 1. Of course if the stop chains 20 are made to allow the tailgate to swing further then the tool box is lowered further while still remaining upright and this may be a quite important feature in certain instances. When the tailgate is closed the toolbox is easily made to rest on the floor 36, ordinarily between the wheel wells 14.

The toolbox will ordinarily be considerably less in width than the corresponding width dimension of the tailgate so that in an extended horizontal position the tailgate will provide horizontal workspaces lateral to the toolbox. The numeral 38 positionally indicates these workspaces, one on each side of the toolbox, and a consideration of the top edge view of the tailgate in FIG. 4 will indicate, at 40—40, the width of these workspaces. The toolbox, especially with a complement of tools therein, will have considerable weight with the result that the opened tail gate will be stabilized thereby increasing the functionality of said workspaces.

What I claim as new and desire to secure by Letters Patent is:

1. In combination, in a pick-up truck having a pick-up box;
   (a) a toolbox dimensioned to fit within the pick-up box;
   (b) a tailgate hinged to the pick-up truck to close the pick-up box in one position of the tailgate, and to extend beyond the pick-up box in the open position of the tailgate; and
   (c) top-center suspension pivot mounting means pivotally supporting said toolboxsolely on said tailgate in all positions of the toolbox and tailgate so that the tailgate swings the toolbox from a closed-storage position within said pick-up box when the tailgate is closed, to an open-access position when the tailgate is opened;
   (d) said toolbox having side wall structure and said means including opposed trunnions on said side wall structure and said means also including opposed stanchions rigidly fixed on said tailgate and pivotally connected with said trunnions.

2. A combination according to claim 1 wherein said pivot mounting means has a pivot axis above the center of gravity of the toolbox so that said toolbox remains upright in both said closed-storage position and said open-access position.

3. A combination according to claim 1 wherein the length of the tailgate is greater than the positionally corresponding dimension of the toolbox in open-access position so that portions of the tailgate lateral to the toolbox constitute workspace platforms when the tailgate is opened to a horizontal position.

* * * * *